Nov. 20, 1934. W. B. BRONANDER Re. 19,375

TWO-SPEED COLLECTOR BELT FOR CIGARETTE MACHINES

Original Filed May 6, 1931

INVENTOR
Wilhelm B. Bronander
BY
Sydney J. Prescott
ATTORNEY

Reissued Nov. 20, 1934 Re. 19,375

UNITED STATES PATENT OFFICE 19,375

TWO-SPEED COLLECTOR BELT FOR CIGARETTE MACHINES

Wilhelm B. Bronander, Montclair, N. J., assignor to American Machine & Foundry Company, a corporation of New Jersey Original No. 1,885,892, dated November 1, 1932, Serial No. 535,517, May 6, 1931. Application for reissue October 3, 1934, Serial No. 746,744

4 Claims. (Cl. 198—76)

This invention relates to cigarette collectors for continuous rod cigarette machines and particularly to a multispeed collector belt, its main object being to deliver the cigarettes on the collector belt in stacked formation, which is convenient for inspection and handling. With this and other objects not specifically mentioned in view, the invention consists in certain constructions and combinations which will be hereinafter fully described and then specifically set forth in the claims hereunto appended.

The cigarettes in the collector of a cigarette machine are usually delivered on a collecting belt and, in order not to interfere with the proper functioning of the collector, are carried away by the said collecting belt as fast as they are delivered. Hence on the collecting belt the cigarettes form but a single layer which is inconvenient for handling, and if a stop is used at one end of the belt the cigarettes tend to pile up only against the stop and leave a single layer on the belt.

To overcome this difficulty, the present invention provides a multi-speed collector belt consisting of two or more collecting belts in tandem, each additional belt running at a fraction of the speed of the preceding one so that the cigarettes on the additional belt become stacked immediately after they are delivered thereon in a number of layers inversely proportional to its speed ratio with respect to the first collecting belt. If the cigarette layers pile against the abutment at one end of the belt the cigarettes which roll back merely add another layer to the layers on the belt.

In carrying the invention into effect there is provided a primary collecting belt adapted to receive cigarettes transferred thereto and move them sidewise in spaced relationship, an abutment, and a secondary collecting belt arranged in tandem with said primary belt to receive cigarettes therefrom and moving at a slower speed to cause the cigarettes to pile on said secondary belt against said abutment. In the best constructions contemplated, the belts are wide enough for a plurality of rows of cigarettes and have guide walls suspended thereover to align the ends of the cigarettes in each row. The various means and parts may be widely varied in construction within the scope of the claims for the particular device selected to illustrate the invention is but one of many possible concrete embodiments of the same. The invention, therefore, is not to be restricted to the specific construction shown and described.

Figure 1:
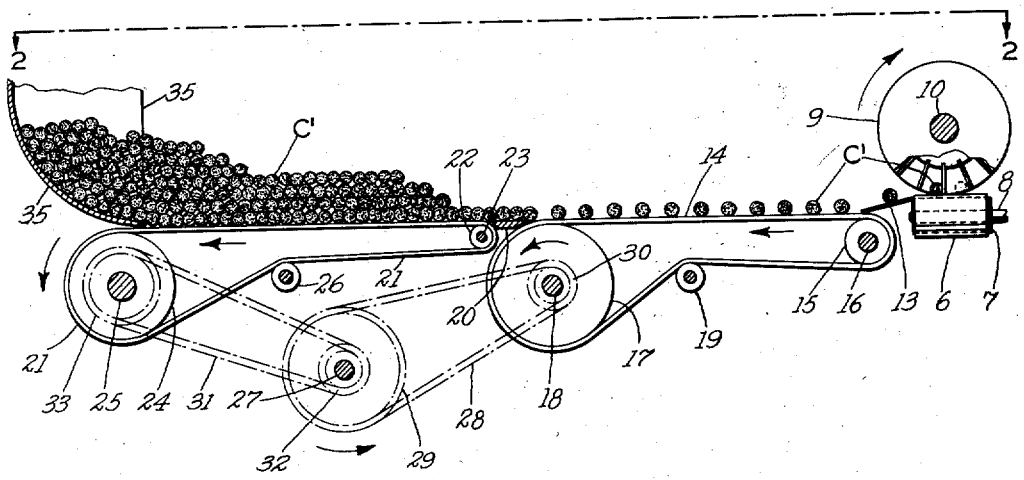
Figure 2:
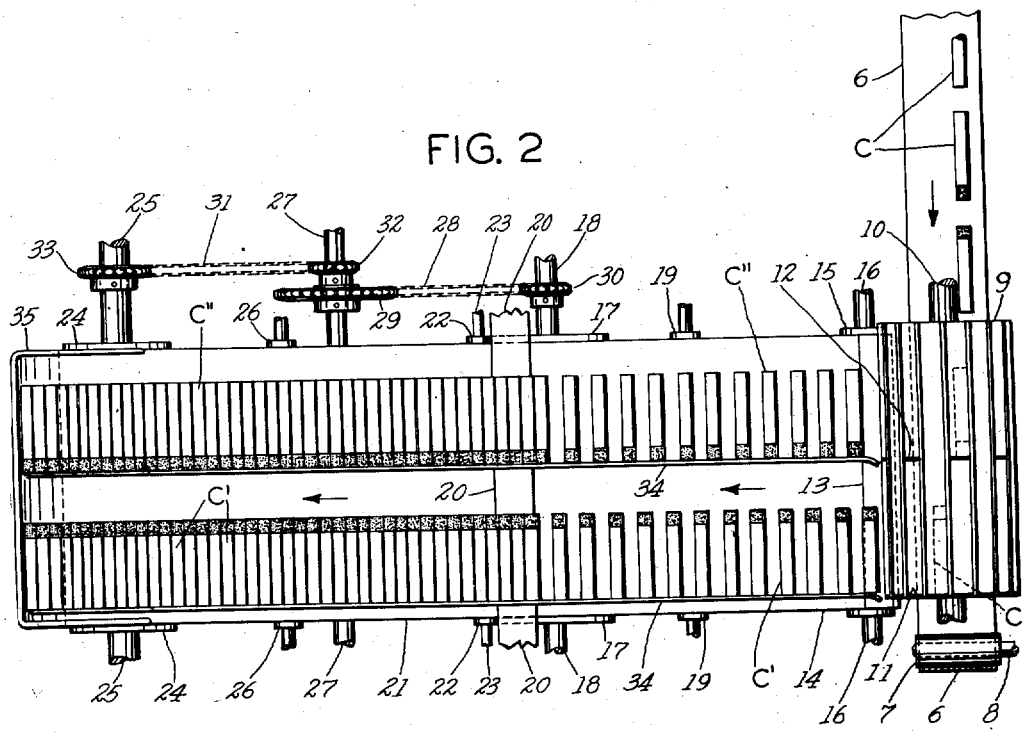

In the accompanying drawing in which the present invention is applied to a two-row cigarette collector such as employed for tipped or printed cigarettes to separately collecting alternate cigarettes with their tips pointing in the same direction in each row:

Fig. 1 is a side elevation of a two-speed cigarette collector belt having a primary and secondary collecting belt; and Fig. 2 is a top view of the same from line 2—2 of Fig. 1.

Referring to the drawing, the belt 6 running over pulley 7 on shaft 8 conveys the cigarettes C from the cutoff of the cigarette machine into the pocketed drum 9 revolving on shaft 10. The drum 9, by means of an end wall 11 and of central partition walls 12 placed in alternate pockets of the drum, aligns alternate cigarettes in two rows C′ and C″ upon an incline 13 on which they slide in single layers upon a primary collecting belt 14 running at right angles to belt 6. The belt 14, which runs over pulley 15 on shaft 16 and pulley 17 on shaft 18 and which is kept in tension by an idler 19, operates to move the cigarettes sidewise in spaced relationship and delivers the two rows of cigarettes C′, C″ over a bridge piece 20 onto a secondary collecting belt 21 arranged in tandem with the belt 14 and running over pulley 22 on shaft 23 and over pulley 24 on shaft 25 and being held in tension by an idler 26.

The shafts 18 and 25 are driven from drive shaft 27 of the cigarette machine, the shaft 18 by chain 28 running over sprockets 29 and 30, and the latter by chain 31 running over sprocket 32 and 33, the diameters of these sprockets being so chosen that the speed of shaft 25 is as many times smaller than that of shaft 18 as the number of layers of cigarettes desired on belt 21.

To keep the two rows of cigarettes C′, C″ in alignment on belts 18 and 21, guide walls 34 suspended from suitable brackets attached to the supporting frame of the collecting belts are placed lengthwise upon these belts, extending from the incline 13 of the collector 9 into an abutment such as the curved end box 35 against which the layers of cigarettes on the belt 21 will pile if they are not removed by the operator.

What is claimed is:

1. In a cigarette collector, the combination with a primary collecting belt operating to move cigarettes sidewise in spaced relationship, of an abutment, and a secondary collecting belt arranged in tandem with said primary belt and moving at a slower speed to cause the cigarettes to pile up on said secondary belt against said abutment.

2. In a cigarette collector, the combination with a primary collecting belt operating to move cigarettes sidewise in spaced relationship, of an abutment, and a second collecting belt arranged in tandem with said primary belt and moving at a slower speed to cause the cigarettes to pile up on said secondary belt against said abutment, said belts being adapted to carry a plurality of parallel rows of cigarettes and provided with longitudinal guide walls suspended over the upper run of the belts to align the ends of the cigarettes of each row.

3. In a cigarette collector, the combination with a primary collecting belt operating to move cigarettes sidewise, of an abutment, and a secondary collecting belt arranged in tandem with said primary belt and moving at a slower speed to cause the cigarettes to pile up on said secondary belt against said abutment.

4. In a cigarette collector, the combination with a primary collecting belt operating to move cigarettes sidewise, of an abutment, and a secondary collecting belt arranged in tandem with said primary belt and moving at a slower speed to cause the cigarettes to pile up on said secondary belt against said abutment, said belts being adapted to carry a plurality of parallel rows of cigarettes and provided with longitudinal guide walls suspended over the upper run of the belts to align the ends of the cigarettes of each row.

WILHELM B. BRONANDER.